(12) United States Patent
Coffin et al.

(10) Patent No.: US 6,707,636 B2
(45) Date of Patent: *Mar. 16, 2004

(54) CARTRIDGE PICKER ASSEMBLY

(75) Inventors: Paul C. Coffin, Fort Collins, CO (US); Robert L. Mueller, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/310,433

(22) Filed: Dec. 5, 2002

(65) Prior Publication Data

US 2003/0081346 A1 May 1, 2003

Related U.S. Application Data

(63) Continuation of application No. 09/910,086, filed on Jul. 20, 2001, now Pat. No. 6,570,735, which is a division of application No. 09/603,156, filed on Jun. 23, 2000, now Pat. No. 6,301,072, which is a continuation of application No. 09/237,516, filed on Jan. 26, 1999, now Pat. No. 6,157,513.

(51) Int. Cl.[7] ............................................. G11B 15/68
(52) U.S. Cl. .................... 360/92; 369/30.43; 369/30.45
(58) Field of Search .................... 360/92; 369/30.43, 369/30.45; 414/751.1, 753.1, 280, 749, 932; 901/16, 23, 25, 31, 36, 38, 39

(56) References Cited

U.S. PATENT DOCUMENTS

| | | |
|---|---|---|
| 4,635,150 A | 1/1987 | Kato et al. |
| 4,772,968 A | 9/1988 | Nonaka et al. |
| 4,945,430 A | 7/1990 | Konishi et al. |
| 4,998,232 A | 3/1991 | Methlie et al. |
| 5,003,417 A | 3/1991 | Grant |
| 5,010,536 A | 4/1991 | Wanger et al. |
| 5,014,255 A | 5/1991 | Wanger et al. |
| 5,043,962 A | 8/1991 | Wanger et al. |
| 5,101,387 A | 3/1992 | Wanger et al. |
| 5,146,375 A | 9/1992 | Satoh et al. |
| 5,150,341 A | 9/1992 | Shibayama |
| 5,242,259 A | 9/1993 | Yeakley |
| 5,285,335 A | 2/1994 | Sato |
| 5,418,664 A | 5/1995 | Ostwald |
| 5,450,391 A | 9/1995 | Pollard |
| 5,513,947 A * | 5/1996 | Helms et al. ............. 414/751.1 |
| 5,596,556 A | 1/1997 | Luffel et al. |
| 5,622,470 A | 4/1997 | Schaefer et al. |
| 5,638,349 A | 6/1997 | Rugg et al. |
| 5,781,517 A * | 7/1998 | Nakajima ................. 369/30.43 |
| 5,805,561 A * | 9/1998 | Pollard ..................... 369/30.43 |
| 6,025,972 A | 2/2000 | Schmidtke et al. |
| 6,104,693 A * | 8/2000 | Coffin et al. ............. 369/30.43 |
| 6,157,513 A | 12/2000 | Coffin et al. |
| 6,160,786 A * | 12/2000 | Coffin et al. ............. 369/30.43 |
| 6,301,072 B1 | 10/2001 | Coffin et al. |
| 2001/0040758 A1 * | 11/2001 | Coffin et al. .................. 360/92 |

FOREIGN PATENT DOCUMENTS

| | | | |
|---|---|---|---|
| EP | 944078 A1 | 9/1999 | |
| JP | 08235708 A * | 9/1996 | ........... G11B/15/68 |
| JP | 10040616 A * | 2/1998 | ........... G11B/15/68 |

* cited by examiner

Primary Examiner—William Klimowicz

(57) ABSTRACT

A cartridge picker assembly may include a frame having a first side wall and a second side wall positioned in spaced-apart relation, the first side wall of said frame defining lateral plane. A thumb assembly is slidably mounted to the first and second side walls of the frame so that the thumb assembly is capable of moving toward and away from a cartridge access end of the frame. A guide member mounted to the thumb assembly engages the lateral guide surface on the first side wall of the frame so that lateral motion of the thumb assembly is controlled as the thumb assembly moves toward and away from the cartridge access end of the frame.

7 Claims, 9 Drawing Sheets

CARTRIDGE PICKER ASSEMBLY

CROSS REFERENCE TO RELATED APPLICATION(S)

This is a continuation of copending application No. 09/910,086 filed on Jul. 20, 2001, now U.S. Pat. No. 6,570,735, Which is a divisional of application Ser. No. 09/603,156, filed on Jun. 23, 2000, now U.S. Pat. No. 6,301,072, which is a continuation of application Ser. No. 09/237,516, filed on Jan. 26, 1999, now U.S. Pat. No. 6,157,513, all of which are incorporated herein by reference for all that they disclose.

FIELD OF INVENTION

This invention relates generally to data storage systems for handling and storing data cartridges, such as optical disk or magnetic tape cartridges, and more specifically to cartridge access devices for engaging and retrieving the data cartridges stored in data storage systems.

BACKGROUND

Many different types of data storage systems exist and are being used to store data cartridges at known locations and to retrieve desired data cartridges so that data may be written to or read from the data cartridges. Such data storage systems are often referred to as "juke box" data storage systems, particularly if they can accommodate a large number of individual data cartridges.

A typical juke box data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are often arranged so that they form one or more vertical stacks, although other configurations are possible. The cartridge read/write device may be located at any convenient location within the data storage system.

The data storage system may also be provided with a moveable cartridge picker assembly or "picker" for transporting the data cartridges between the various cartridge receiving devices, e.g., between the cartridge storage racks and the cartridge read/write devices. A typical cartridge picker assembly or picker may also be provided with a cartridge plunge mechanism or "thumb" assembly for engaging the various data cartridges contained in the cartridge receiving devices and for drawing them into the picker. A picker positioning system associated with the cartridge picker assembly may be used to move the cartridge picker assembly along the various cartridge receiving devices.

Data storage systems of the type described above are usually connected to a host computer system which may be used to access or store data on the data cartridges. For example, if the host computer system issues a request for data contained on a particular data cartridge, a control system associated with the data storage system will actuate the picker positioning system to move the picker assembly along the cartridge storage racks until the picker assembly is positioned adjacent the desired data cartridge. The cartridge plunge mechanism or "thumb" assembly associated with the picker assembly may then remove the data cartridge from the cartridge storage rack and draw it into the picker assembly. The picker positioning system may then be actuated to move the picker assembly to the appropriate cartridge read/write device. Once properly positioned adjacent the cartridge read/write device, the thumb assembly may insert the selected data cartridge into the cartridge read/write device so that the host computer may thereafter read data from or write data to the data cartridge. After the read/write operation is complete, the thumb assembly may be actuated to remove the data cartridge from the cartridge read/write device. The picker assembly may thereafter return the data cartridge to the appropriate location in the cartridge storage rack.

A typical cartridge plunge mechanism or "thumb" assembly is usually slidably mounted to the picker and is provided with a thumb actuator system to move the thumb assembly toward and away from a cartridge access end of the picker. For example, if it is desired to retrieve a data cartridge from a cartridge receiving device, the thumb actuator system moves the thumb assembly toward the cartridge access end of the picker so that the thumb assembly can engage or "grab" the data cartridge. Thereafter, the thumb actuator system may retract the thumb assembly and engaged data cartridge into the picker. If it is desired to load the data cartridge into the cartridge receiving device, then the thumb actuator moves the thumb assembly and data cartridge toward the cartridge access end of the picker, and inserts the data cartridge into the cartridge receiving device.

In order to reliably engage a cartridge, the thumb assembly must be positioned adjacent to the cartridge within precise tolerances. As the thumb assembly is moved toward or away from the cartridge access end of the picker, lateral and vertical movement is limited by the thumb actuator system or by guide rails on each side of the thumb assembly. If the thumb assembly is not correctly positioned adjacent to the cartridge, the thumb assembly will be unable to properly engage or disengage the cartridge.

Currently known mounting systems are not without their problems. In one currently known mounting system, the thumb assembly is mounted to the cartridge picker assembly on a lead screw which drives and positions the thumb assembly. A lead screw is rotatably mounted to the cartridge picker assembly and runs the length of the picker assembly, passing through the thumb assembly and engaging with a gear or teeth on the thumb assembly. Thus, when the lead screw rotates, the thumb assembly is moved toward or away from the cartridge access end of the picker. The lead screw drive system provides generally good positioning accuracy once aligned, but requires the use of expensive machined elements and is difficult to assemble and align. Furthermore, the teeth and threads tend to wear down over time as they turn against each other, reducing the positioning accuracy. In addition, the minimum gaps required for moving parts may exceed the tolerances required for lateral positioning. For example, if the thumb actuator system is a lead-screw drive system, gaps are required between the lead-screw and the teeth in the thumb assembly to prevent binding. These gaps required for the operation of the drive system may allow lateral movement which exceeds the tolerances required for lateral positioning. A lead-screw drive system may also require a secondary guide member, such as a precision-machined rod, which is relatively expensive and may pose assembly and alignment problems.

In addition, positioning errors may accumulate within the picker with each additional part in the guide system. For example, for a lead-screw drive system, the position of the thumb assembly is affected by multiple parts. First, the gap between the lead-screw and the threads in the thumb assembly has a given tolerance. The lead-screw may be held in place by a set of ball bearings which also have a given tolerance. The ball bearings may be held in a casing having a tolerance, which in turn may be attached to the side of the picker which also has a tolerance. Each tolerance adds up, forming a tolerance stack, making it more difficult to maintain the lateral position of the thumb assembly as the tolerance stack deepens.

In another currently known mounting system, the thumb assembly is mounted in the picker with guide rails on each side of the picker. Support members extend from the sides of the thumb assembly to engage in the picker guide rails to guide the thumb assembly as it moves toward and away from the cartridge access end of the picker. A guide rail mounting system provides a less-expensive alternative to a lead-screw, and may eliminate some of the expensive machined parts and may facilitate assembly and alignment. However, a guide rail mounting system is subject to a high tolerance stack and large, molded parts which are easily warped. The guide rails are typically molded into the plastic side panels of the picker, which can warp during manufacture and assembly, and which can flex during operation.

In addition, the drive system of the picker assembly typically mounts to one side, correctly positioning that side of the picker assembly adjacent a cartridge or a cartridge receiving device. However, guide rails are located on both sides of the picker, and there may be several elements between the two sides of the picker. Therefore, the tolerance stack for the guide rail mounting system includes the tolerances for all elements between the correctly positioned first side and the guide rail on the second side. In other words, correct positioning of the thumb assembly in a picker having a guide rail mounting depends upon correct sizing and placement of multiple elements in the picker. The large tolerance stack and the dependence upon easily warped or flexed components leads to an undesirably high rate of incorrect positioning.

Consequently, a need exists for an improved thumb assembly mounting and guide system to control lateral motion. In particular, a need exists for a guide system having a reduced tolerance stack and having more easily controlled tolerances, using relatively inexpensive components.

SUMMARY OF THE INVENTION

A cartridge picker assembly may include a frame having a first side wall and a second side wall positioned in spaced-apart relation, the first side wall of said frame defining a lateral guide surface that is substantially parallel to a lateral plane. A thumb assembly is slidably mounted to the first and second side walls of the frame so that the thumb assembly is capable of moving toward and away from a cartridge access end of the frame. A guide member mounted to the thumb assembly engages the lateral guide surface on the first side wall of the frame so that the lateral motion of the thumb assembly is controlled as the thumb assembly moves toward and away from the cartridge access end of the frame.

BRIEF DESCRIPTION OF THE DRAWINGS

Illustrative and presently preferred embodiments of the invention are shown in the accompanying drawing in which.

DETAILED DESCRIPTION OF THE INVENTION

Figure 1:
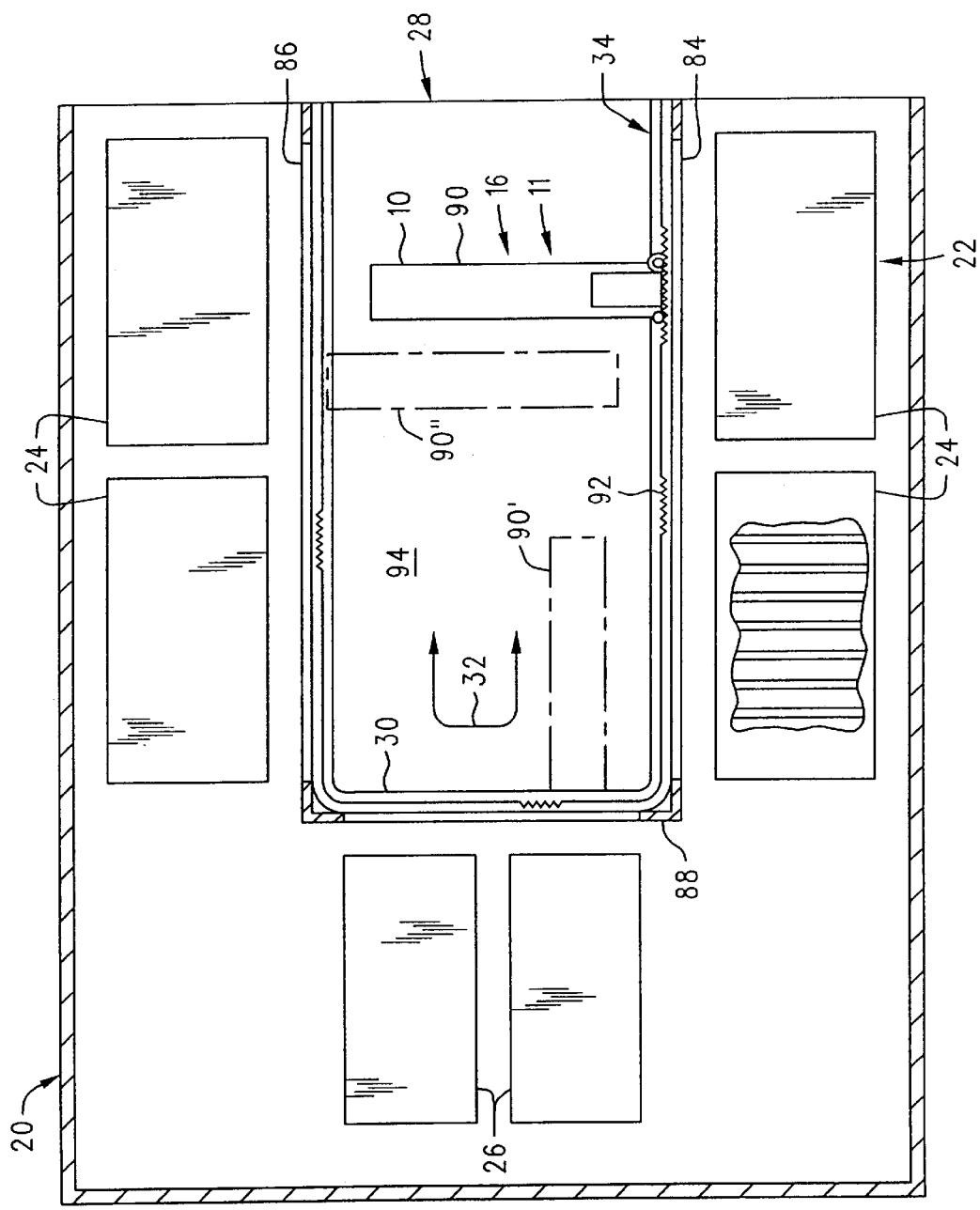
FIG. 1 is a plan view of a media access device and cartridge picker assembly according to the present invention as it may be used in a data storage system to access and transport data cartridges contained within the data storage system.
Figure 2:
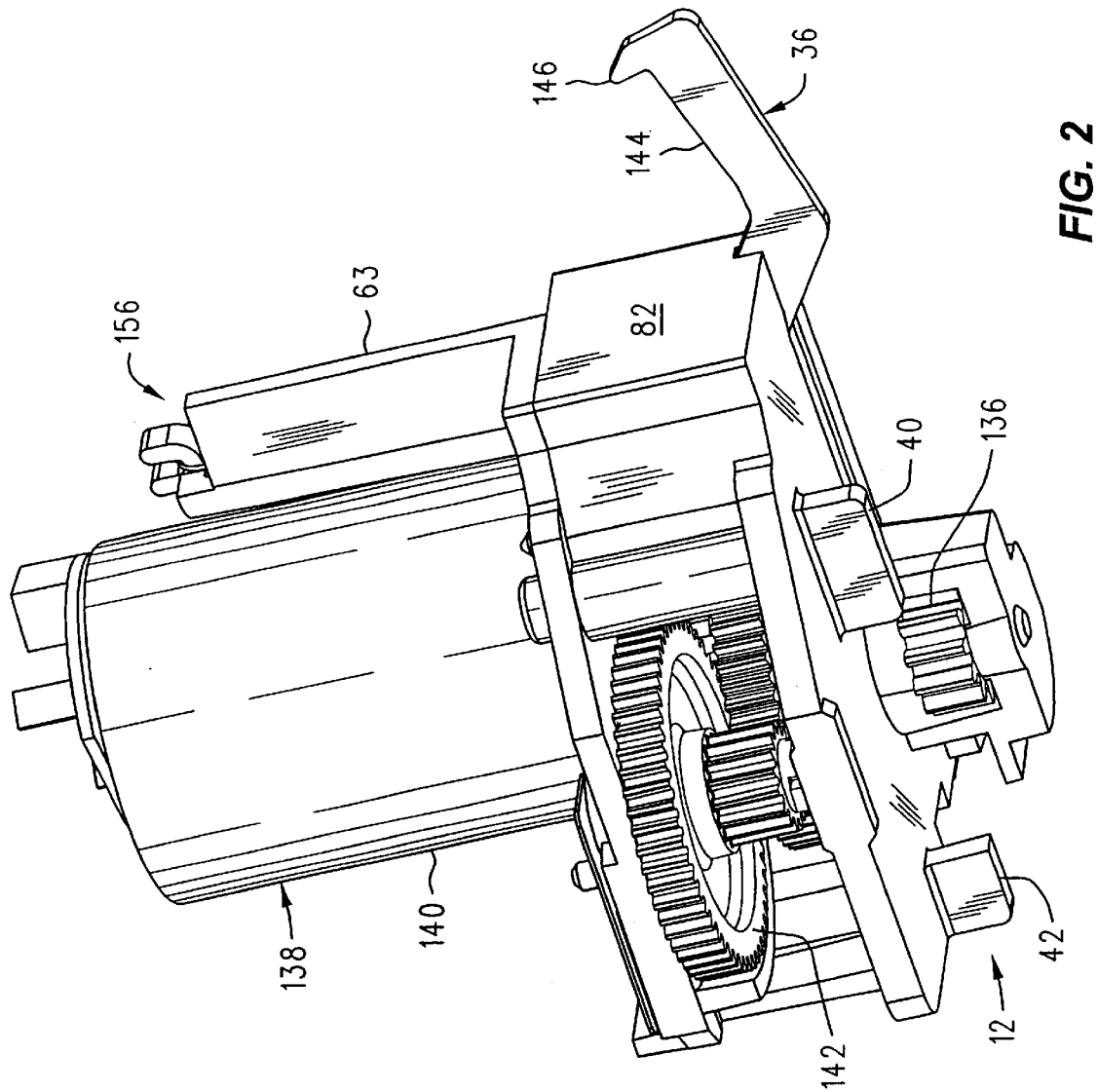
FIG. 2 is a side view of a thumb assembly showing the guide member.

A cartridge picker assembly or "picker" 10 having an improved thumb referencing and guide system 11 is shown in FIG. 1 as it could be used in a "juke box" data storage system 20 to transfer data cartridges 22 between one or more cartridge receiving devices, such as one or more cartridge storage racks or magazines 24 and one or more cartridge read/write devices 26.

The improved thumb referencing and guide system 11 is used to support and guide a cartridge plunge mechanism or "thumb assembly" 16 as the same is moved back and forth within the picker assembly 10. The improved thumb referencing and guide system 11 comprises a guide member 12 provided on the cartridge plunge mechanism 16 and a lateral guide surface 14 on the cartridge picker assembly 10. The improved thumb referencing and guide system 11 thereby provides control of the lateral position of the cartridge plunge mechanism 16 within the cartridge picker assembly 10. As the cartridge plunge mechanism 16 slides within the cartridge picker assembly 10 to grasp or release a data cartridge 22, the guide member 12 slides against the lateral guide surface 14 to control lateral position. The guide member 12 and the lateral guide surface 14 thereby substantially reduce the likelihood that the cartridge plunge mechanism 16 will become mis-aligned and fail to grasp a data cartridge 22.

The juke box data storage system 20 in which the improved thumb referencing and guide system 11 may be used is best seen in FIG. 1 and may comprise a generally rectangularly shaped frame or chassis assembly 28 around which are arranged a plurality of cartridge receiving devices, such as the cartridge storage racks or magazines 24 and cartridge read/write devices 26. In the embodiment shown and described herein, the various cartridge receiving devices (e.g., the cartridge storage racks or magazines 24 and the cartridge read/write devices 26) are positioned so that they define a generally U-shaped configuration, as best seen in FIG. 1. However, other configurations are possible. Alternatively, and as will be described in greater detail below, the cartridge picker assembly or picker 10 according to the present invention may be used in any of a wide range of other types of data storage systems.

The cartridge picker assembly 10 may be mounted to a U-shaped guide track 30 provided on the frame or chassis assembly 28. The U-shaped guide track 30 guides the cartridge picker assembly 10 along a generally U-shaped path 32, thereby allowing the cartridge picker assembly or picker 10 to access all of the cartridges 22 stored in the various cartridge receiving devices (e.g., 24, 26). A picker positioning system 34 operatively associated with the cartridge picker assembly 10 may be used to move the cartridge picker assembly 10 to various positions along the U-shaped guide track 30.

Figure 9A:
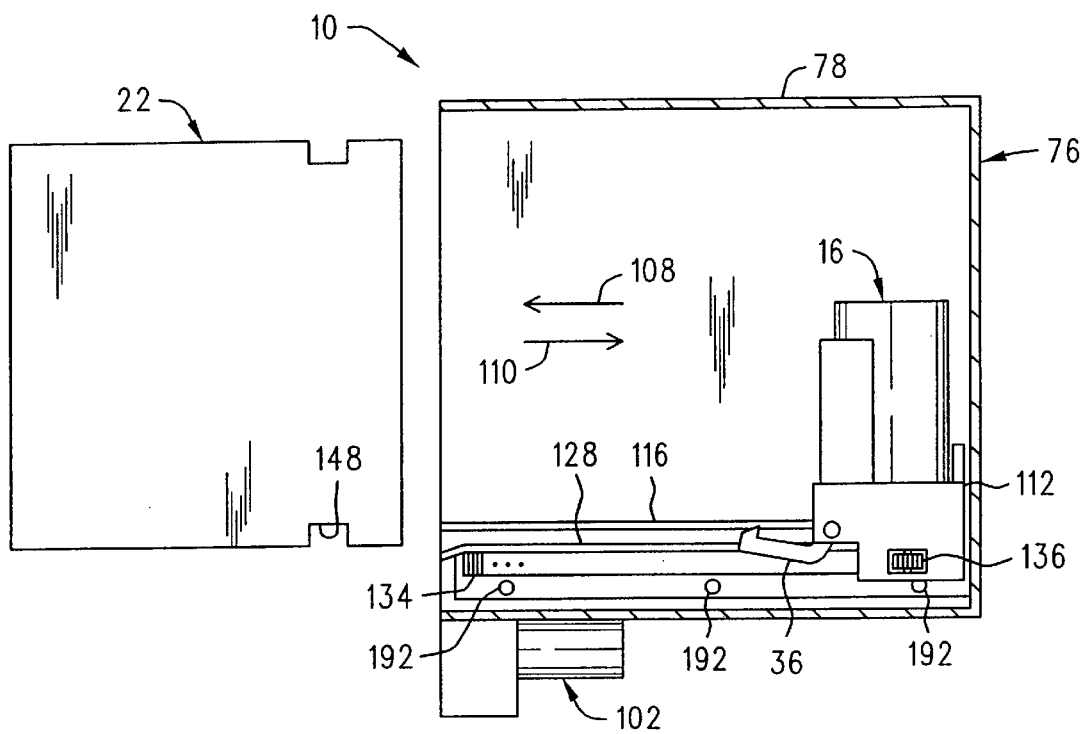
FIGS. 9(a–b) are simplified sectional views in elevation showing the thumb assembly in the retracted and extended positions.

Referring now primarily to FIGS. 2, 4, 6, and 7, the cartridge picker assembly 10 may be provided with a cartridge plunge mechanism or "thumb" assembly 16 for removing and replacing the data cartridges 22 contained within the various cartridge receiving devices. In one preferred embodiment, the thumb assembly 16 is moveably mounted within the cartridge picker assembly 10 so that the thumb assembly 16 may be moved between a retracted position 112 (shown in FIG. 9A) and an extended position 114 (shown in FIG. 9B). That is, the thumb assembly 16 may be extended and retracted within the cartridge picker assembly 10 in the directions indicated by arrows 108 and 110, respectively. The thumb assembly 16 may be provided with a finger assembly 36 to allow the thumb assembly 16 to engage and disengage a data cartridge 22, as will be described in greater detail below.

Figure 6:
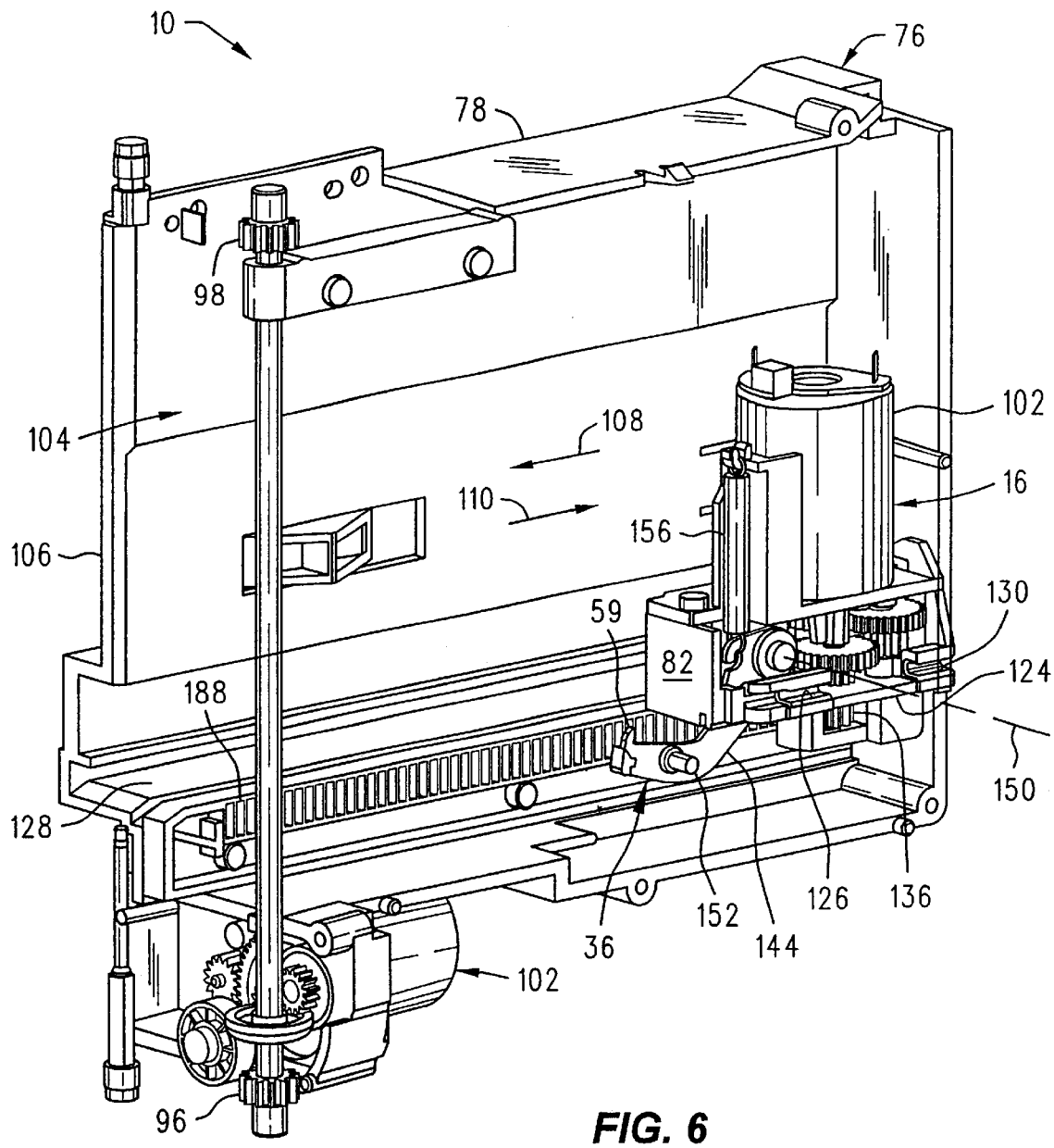
FIG. 6 is a perspective view of the left side of the cartridge picker assembly showing the thumb assembly.
Figure 8:
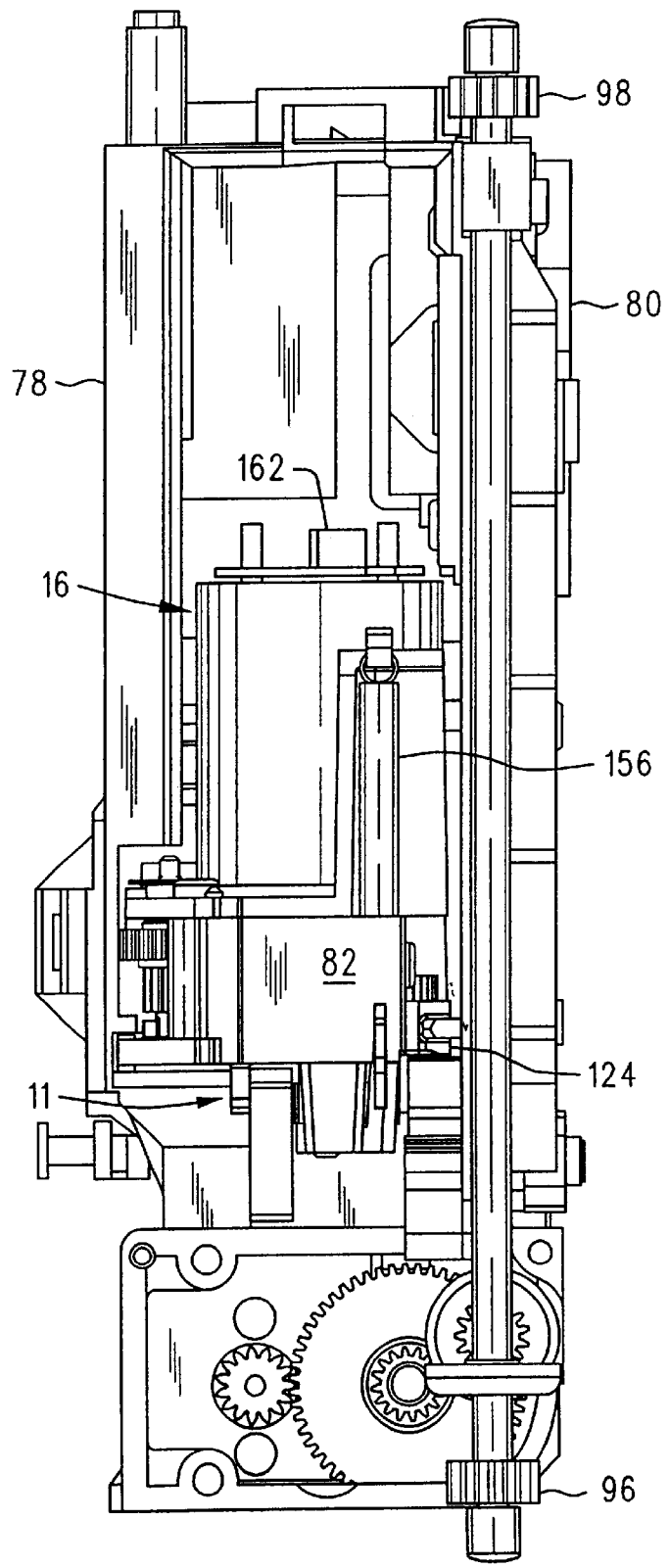
FIG. 8 is an end view in elevation showing the engagement of the thumb and guide rail assemblies.
Figure 10:
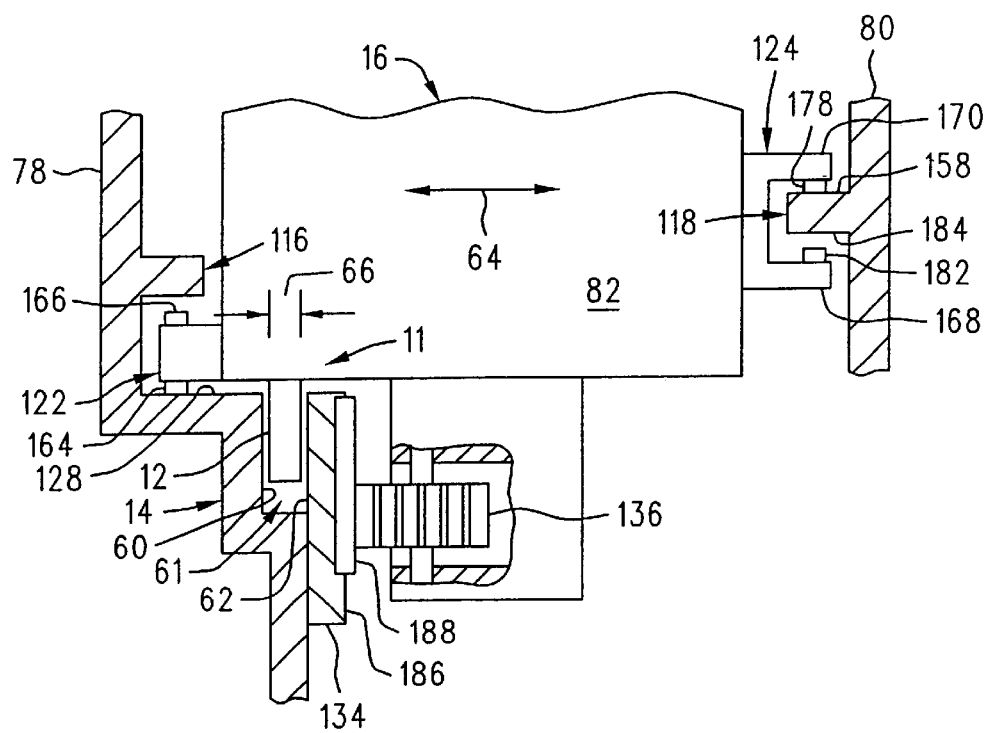
FIG. 10 is an enlarged cross-section view in elevation of the thumb and guide rail assembly more clearly showing the engagement of the guide member with the lateral guide surface.

Referring now primarily to FIGS. 3, 4, 6, and 10, the lateral position of the thumb assembly 16 within the cartridge picker assembly 10 may be controlled by an improved thumb referencing and guide system 11 (FIG. 10), comprising the guide member 12 and the lateral guide surface 14. The guide member 12 may comprise a plurality of guide ribs that extend from the thumb assembly 16. In one preferred embodiment, the guide member 12 comprises a front guide rib 40 and a rear guide rib 42. The front and rear guide ribs 40 and 42 have a height 48 and a width 50 enabling them to engage the lateral guide surface 14. As seen in FIGS. 6 and 10, the lateral guide surface 14 may comprise a first contact surface 60 and a second contact surface 62, placed in parallel spaced-apart relation to form a channel 61 (see FIG. 10). The guide member 12 engages with the lateral guide surface 14, as seen in FIG. 8, to prevent side-to-side, or lateral movement (indicated by arrows 64) of the thumb assembly.

In one preferred embodiment, the first contact surface 60 is substantially parallel to a lateral plane formed by an X axis and a Z axis (FIG. 5), and may comprise a first side wall 78 of the cartridge picker assembly frame 76. The second contact surface 62 may comprise an elongate wall attached to the first side wall 78 of the cartridge picker assembly frame 76. Hence, the lateral guide surface 14 controls the lateral position of the thumb assembly 16 based upon the first side wall 78 rather than both the first side wall 78 and a second side wall 80 of the cartridge picker assembly frame 76. The resulting tolerance stack is thereby minimized by removing a dependence upon the second side wall 80 and various other components between the first and second side walls 78 and 80.

This is a substantial advantage over using the guide rails (e.g., 116 and 118) at each side of the thumb assembly 16 for lateral positioning. One benefit of using only the first side wall 78 to control lateral position of the thumb assembly 16 is that the number of elements in the cartridge picker assembly 10 included in the tolerance stack for lateral position is minimized. A second benefit is that the elements remaining in the tolerance stack are more easily controlled. For example, large molded plastic elements such as the second side wall 80 of the cartridge picker assembly 76 and the thumb assembly frame 82, which are easily warped during the molding process, are kept out of the tolerance stack.

Having briefly described the improved thumb referencing and guide system 11 including the guide member 12 and the lateral guide surface 14, as well as some of its more significant features and advantages, the various embodiments of the improved thumb referencing and guide system 11 according to the present invention will now be described in detail. However, before proceeding with the description, it should be noted that the improved thumb referencing and guide system 11 according to the present invention may be utilized in any of a wide range of cartridge engaging assemblies in any of a wide variety of data storage systems now known or that may be developed in the future. Accordingly, the present invention should not be regarded as limited to the particular data storage system 20 and cartridge picker assembly 10 shown and described herein.

With the foregoing considerations in mind, one embodiment of an improved thumb referencing and guide system 11 is shown and described herein as it may be used in a cartridge picker assembly 10. The cartridge picker assembly 10 may, in turn, be used in a portion of a "juke box" data storage system 20. In one preferred embodiment, the juke box data storage system 20 may comprise a data storage system of the type shown and described in U.S. Pat. application Ser. No. 09/045,134, filed Mar. 20, 1998, now U.S. Pat. No. 6,025,972, entitled "Multi-Plane Translating Cartridge Handling System," which is incorporated herein by reference for all that it discloses. Alternatively, the data storage system 20 may be of e type shown and described in U.S. Pat. No. 5,596,556, entitled "Linear Displacement and Support Apparatus for use in a Cartridge Handling System," which is also incorporated herein by reference for all that it discloses.

Referring now primarily to FIG. 1, the data storage system 20 shown and described in U.S. Pat. No. 6,025,972 referred to above may comprise a generally rectangularly shaped frame or chassis assembly 28 having a pair of opposed side portions 84 and 86 and an end portion 88 around which are positioned various cartridge receiving devices. More specifically, a pair of cartridge storage racks or magazines 24 may be positioned adjacent each opposed side portion 84 and 86 of the frame or chassis assembly 28, whereas a pair of cartridge read/write devices 26 may be positioned adjacent the end portion 88 of the frame assembly 28. Accordingly, the various cartridge receiving device (e.g., the cartridge storage racks or magazines 24 and the cartridge read/write devices 26) define a generally U-shaped configuration.

A picker positioning system 34 may be used to move the cartridge picker assembly 10 along the U-shaped guide track 30. For example, in the embodiment shown and described herein, the picker positioning system 34 may move the cartridge picker assembly 10 between a first position 90 adjacent the first side portion 84 of the frame assembly 28, a second position 90' adjacent the end portion 88 of frame assembly 28, and a third position 90" adjacent the second side portion 86 of frame assembly 28.

The picker positioning system 34 may comprise a rack and pinion drive system having a U-shaped gear rack 92 mounted to the lower plate 94 of frame assembly 28 at a position adjacent the U-shaped guide track 30. The cartridge picker assembly 10 may be provided with a lower pinion gear 96 (FIG. 5) sized and positioned so that it will engage the lower U-shaped gear rack 92 provided on the lower plate 94. Similarly, the cartridge picker assembly 10 may also be provided with an upper pinion gear 98 sized and positioned so that it will engage an upper U-shaped gear rack provided on an upper plate 100 (not shown). A drive pinion actuator system 102 mounted to the cartridge picker assembly 10 may be used to drive the lower and upper pinion gears 96 and 98, thereby allowing the picker assembly 10 to be moved along the U-shaped path 32.

Figure 5:
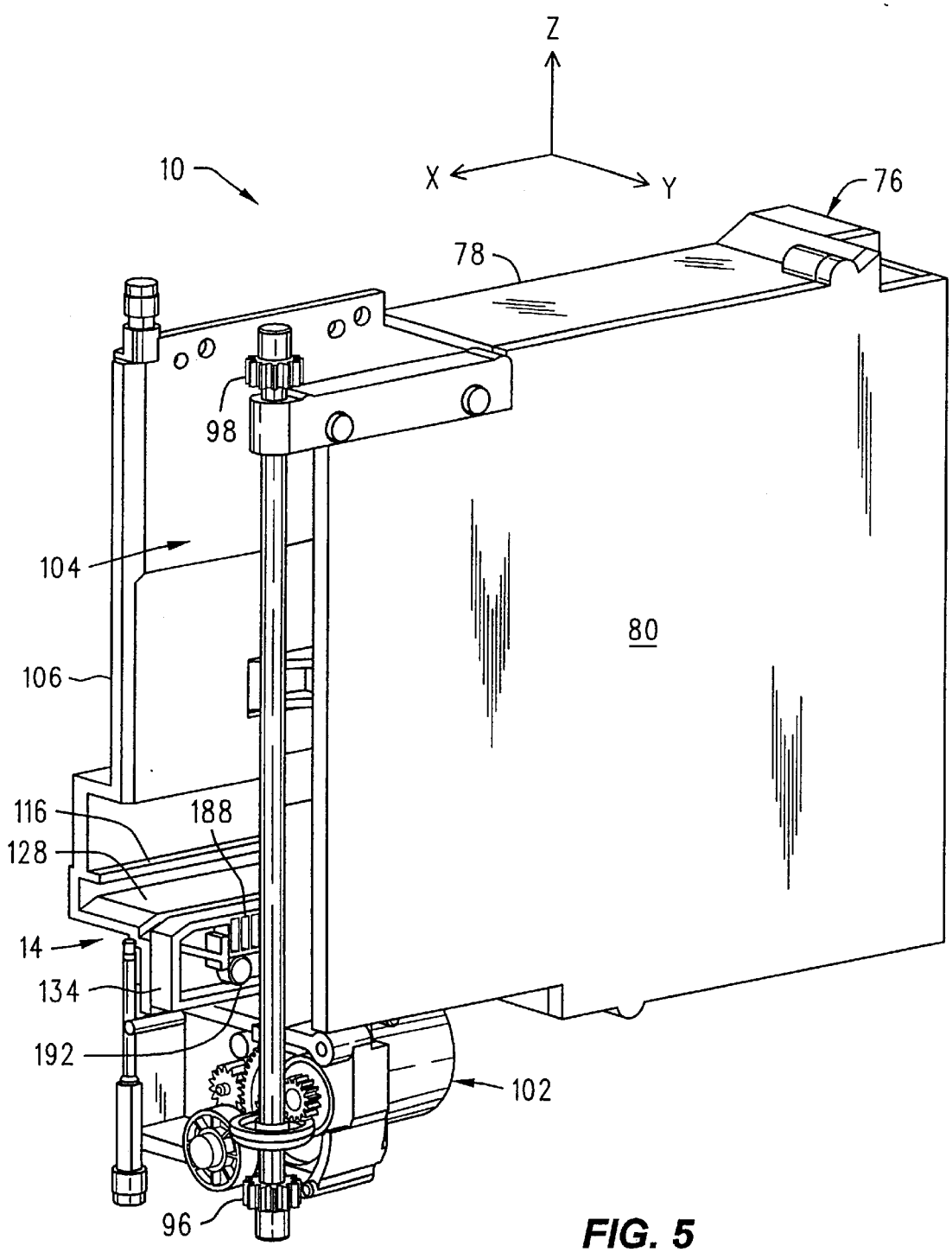
FIG. 5 is a perspective view of the cartridge picker assembly.
Figure 7:
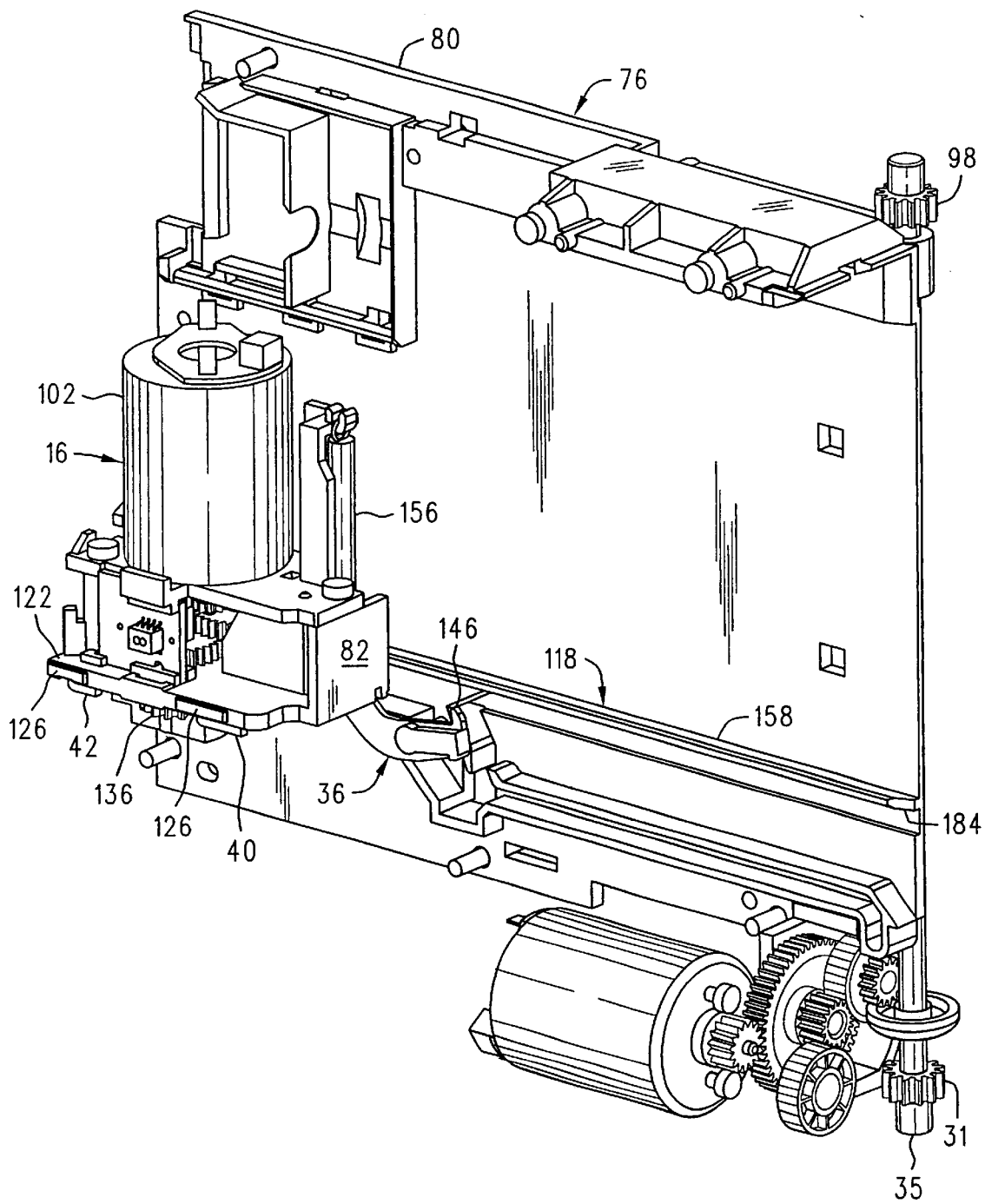
FIG. 7 is a perspective view of the right side of the cartridge picker assembly showing the thumb assembly.

The details of the cartridge picker assembly 10 that may be utilized in one preferred embodiment of the present invention are best seen in FIGS. 5–7. Essentially, the cartridge picker assembly 10 may include a picker frame assembly 76 having a first side wall or member 78 and a second side wall or member 80. The two side members 78 and 80 define an interior chamber or cavity 104 of sufficient size to receive a data cartridge 22. The thumb assembly 16 is slidably mounted to the frame assembly 76 so that the thumb assembly 16 may be moved along an X axis toward and away from the cartridge access end 106 of frame assembly 76, i.e., generally in the directions of arrows 108 and 110, respectively. See FIG. 6. More specifically, the thumb assembly 16 is slidably mounted to the frame assembly 76 so that the thumb assembly 16 may be moved between a retracted position 112 (illustrated in FIG. 9a) and an extended position 114 (illustrated in FIG. 9b).

The thumb assembly 16 may be mounted on first and second elongate guide rails 116 and 118 that are provided on the first and second sides 78 and 80 of the picker frame assembly 76. See FIGS. 10, 11, and 12. The first elongate guide rail 116 includes a first horizontal guide surface 128, whereas the second elongate guide rail 118 includes a second horizontal guide surface 158. In one preferred embodiment, the first and second horizontal guide surfaces 128 and 158 are non-coplanar, as best seen in FIG. 10. Alternatively, the first and second horizontal guide surfaces 128 and 158 may be coplanar. In any event, the main body portion 82 of the thumb assembly 16 may include a first flange member 122 sized and positioned to engage the first horizontal guide surface 128 of first elongate guide rail 116. The main body portion 82 of the thumb assembly 16 may also include a second or C-shaped flange member 124 adapted to engage the second horizontal guide surface 158 of the second elongate guide rail 118.

Figure 11:
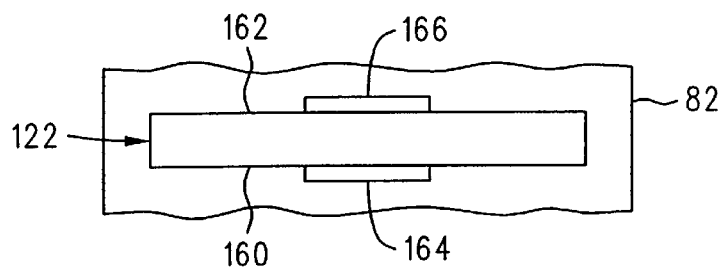
FIG. 11 is an enlarged side view of the first flange member of the thumb assembly.

Referring now primarily to FIGS. 10 and 11, the first flange member 122 may comprise a generally rectangularly shaped member having a bottom surface 160 and a top surface 162. A first or lower bearing member 164 is provided on the bottom surface 160 of first flange member 122 and contacts the first horizontal guide surface 128, as best seen in FIG. 10. The top surface 162 of flange member 122 may also be provided with an upper bearing member 166. The upper bearing member 166 is positioned so that it may contact a horizontal capture rail 116. However, upper bearing member 166 does not normally contact horizontal capture rail 116.

Figure 12:
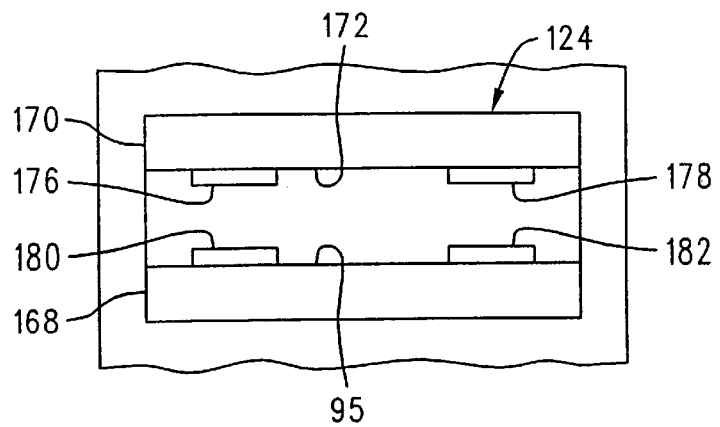
FIG. 12 is an enlarged side view of the second, C-shaped flange member of the thumb assembly.

The second flange member 124 may comprise a substantially C-shaped member and is best seen in FIGS. 10 and 12. Essentially, the second flange member 124 comprises a lower horizontal member 168 and an upper horizontal member 170. The bottom facing surface 172 of upper horizontal member 170 may be provided with a pair of bearing members 176 and 178 positioned in spaced-apart relation. The pair of bearing members 176 and 178 contact the second horizontal surface 158 on the second guide rail 118, as best seen in FIG. 10. The upper facing surface 174 of lower horizontal member 168 may be provided with a pair of bearing members 180 and 182 positioned so that they may contact the bottom surface 184 of the second guide rail 118. The bearing members 180 and 182 provided on the lower horizontal member 168 do not normally contact the bottom surface 184 of the second guide rail 118.

In accordance with the structural arrangement described above, the thumb assembly 16 is vertically supported on one side by the bearing member 164 that contacts the first horizontal surface 128, and on the other side by the bearing members 176 and 178 that contact the second horizontal surface 158. The three bearing members 164, 176, and 178 allow the thumb assembly 16 to be moved along a defined horizontal plane (not shown), even though the bearing members 164, 176, and 178 themselves may be non-coplanar.

The various components just described may be made from any of a wide range of materials, such as metals or plastics, suitable for the intended application. For example, in one preferred embodiment, the first and second side members 78 and 80 comprising the picker frame assembly 76 are molded from a polycarbonate plastic material. Accordingly, the various components and features contained therein, e.g., the guide rail 116, horizontal guide surface 128, along with the second guide rail 118, may be provided as integral components of the respective side members 78 and 80. Alternatively, the first and second side members 78 and 80 comprising the picker frame assembly 76 may be made from other materials, in which case the various components and features of the side members 78 and 80 may comprise integral components or separate elements, depending on the particular design and material to be utilized.

The main body portion 82 of the thumb assembly 16 may also be made from any of a wide range of materials suitable for the intended application. For example, in the embodiment shown and described herein, the main body portion 82 of thumb assembly 16 is made from nylon with a small amount of Teflon® added (e.g., about 15% by weight) as a friction modifier, although other materials could also be used. In one preferred embodiment, the various bearing shoes 126 provided on the first and second flange members 122 and 124 of the main body portion 82 of the thumb assembly 16 comprise integral portions of the main body portion 82. Alternatively, the bearing shoes 126 could comprise separate elements that may then be affixed to the first and second flange members 122 and 124. If so, the various bearing shoes 126 may be fabricated from any of a wide range of materials (e.g., Teflon®) suitable for providing a low friction engagement with the first and second guide rails 116 and 118.

The foregoing description of the data storage system 20 and related components (e.g., the cartridge picker assembly 10, thumb assembly 16, and picker positioning system 34) is provided in order to better understand one environment in which the improved thumb referencing and guide system 11 according to the present invention may be used. However, as was mentioned above, it should be understood that the improved thumb referencing and guide system 11 may be used in any of a wide range of other types of data storage systems or other similar devices having moveable internal components. Consequently, the present invention should not be regarded as limited to the particular data storage system 20 shown and described herein. Also, since detailed descriptions of the data storage system 20 and related components (e.g., the cartridge picker assembly 10 and the picker positioning system 34) are not required to understand or practice the thumb referencing invention, the particular data storage system 20 and related components that may be used in conjunction with the improved thumb referencing and guide system 11 will not be described in greater detail herein.

Figure 9B:
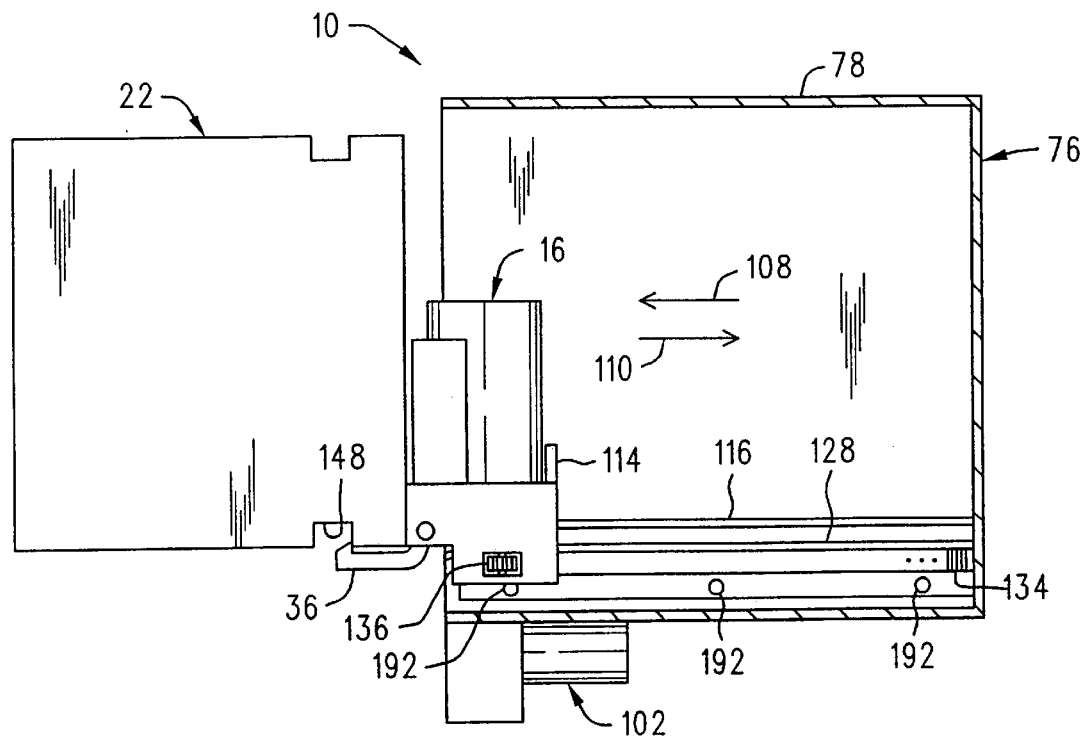

Referring now primarily to FIGS. 3, 4, 5, and 10, the improved thumb referencing and guide system 11 may comprise a guide member 12 and a lateral guide surface 14 enabling the cartridge picker assembly 10 to move longitudinally along an X axis between a retracted position 112 (shown in FIG. 9A) and an extended position 114 (shown in FIG. 9B). The improved thumb referencing and guide system 11 guides the cartridge picker assembly 10 along a lateral plane formed by an X axis and a Z axis (FIG. 5), allowing the finger assembly 36 to reliably grasp a data cartridge 22. In one preferred embodiment, the finger assembly 36 must be positioned adjacent a data cartridge 22 with a maximum side to side offset of about 1.5 mm.

The guide member 12 may comprise a plurality of ribs that extend from the thumb assembly 16. In one preferred embodiment, the guide member 12 comprises a front guide rib 40 and a rear guide rib 42. The guide ribs 40 and 42 may be generally rectangular in shape and are attached to the thumb assembly frame 82 so that they extend from the frame 82 to engage the lateral guide surface 14.

The guide member 12 has a width 50 substantially equal to or just smaller than the distance 66 between the first contact surface 60 and the second contact surface 62, enabling the guide member 12 to slide longitudinally in the cartridge picker assembly 10 along an X axis (FIG. 5), but preventing the guide member 12 and the thumb assembly 16 from moving laterally along a Y axis (FIG. 5).

The lateral guide surface 14 comprises a generally smooth, or otherwise low-friction surface against which the guide member 12 slides as the thumb assembly 16 moves within the cartridge picker assembly 10. The lateral guide surface 14 may comprise a first contact surface 60 and a second contact surface 62, placed in spaced-apart, parallel relation to form a channel in which the guide member 12 fits. The first contact surface 60 and the second contact surface 62 are placed apart from each other at a distance 66 which is substantially equal to or just larger than a width 50 of the guide member 12. This allows the guide member 12 to slide along an X axis but limits side to side movement along a Y axis(FIG. 5) to allow the finger assembly 36 to reliably grasp an adjacent data cartridge (e.g., 22). This provides a second benefit of preventing rotation of the thumb assembly 16 around a Z axis which would cause binding of the thumb assembly 16 and misalignment of the finger assembly 36.

The front guide rib 40 and a rear guide rib 42 have a length 44 and 46, respectively. The guide ribs 40 and 42 may have any suitable lengths, but in a preferred embodiment lengths 44 and 46 are greater than a distance 66 between the first contact surface 60 and the second contact surface 62. Along with the lateral alignment benefits during use, this facilitates insertion of the thumb assembly 16 into the cartridge access end 106 of the cartridge picker assembly 10 during the assembly process. As the rear guide rib 42 enters the channel formed by the first and second contact surfaces 60 and 62, the thumb assembly must be substantially aligned along the X axis before it can be fully inserted. This ensures that the front guide rib 40 will be at or near the proper location to enter the channel, reducing the difficulty of engaging the front guide rib 40 with the lateral guide surface 14. The guide ribs 40 and 42 may also have curved edges 56 to facilitate assembly and to avoid binding during movement of the thumb assembly 16.

The guide ribs 40 and 42 may alternatively have lengths 44 and 46 less than the distance 66 between the first and second contact surfaces 60 and 62, thereby reducing material usage, but the thumb assembly 16 will be able to rotate around a Z axis even after the rear guide rib 42 is engaged with the lateral guide surface 14, making insertion of the front guide rib 40 more difficult.

Two or more guide members (e.g., 40 and 42) may provide the necessary control of side to side movement with a minimum of material usage. Alternatively, the guide member 12 may comprise one elongate guide rib having a length greater than the distance 66 between the first and second contact surfaces 60 and 62.

The first contact surfaces 60 of the lateral guide surface 14 may comprise a substantially smooth, elongate member attached to the cartridge picker assembly frame 76. In one preferred embodiment best seen in FIGS. 6 and 10 the first contact surface 60 comprises the first side wall 78 of the cartridge picker assembly frame 76, thereby minimizing the tolerance stack by avoiding components and interfaces between the cartridge picker assembly frame 76 and the first contact surface 60.

The second contact surface 62 may comprise a second substantially smooth, elongate member mounted opposite the first contact surface 60 in parallel, spaced-apart relation. In one preferred embodiment the second contact surface 62 comprises a gear rack 134 having a substantially smooth side 62 and an opposite side 186 having gear teeth 188 for operatively engaging the pinion 136 on the thumb assembly 16.

The second contact surface 62 may be mounted to the first contact surface 60 with a horizontal bottom surface 190 between them to form a channel for the guide member 12. The horizontal bottom surface 190 may comprise a portion of the second contact surface 62 or another component. In one preferred embodiment shown in FIG. 10 the horizontal bottom surface 190 comprises the first side wall 78 of the cartridge picker assembly frame 76.

The second contact surface 62 may be mounted to the first contact surface 60, or to any components interposed between the first and second contact surfaces 60 and 62, using any suitable method now known or which may be developed in the future. For example, the second contact surface 62 may be bonded with an adhesive, welded, or molded with the first contact surface 62 as an integral part. In one preferred embodiment, the second contact surface 62 is attached to the first side wall 78 with screws 192.

The guide member 12 is proportioned to allow slidable engagement with the lateral guide surface 14. The front and rear guide ribs 40 and 42 preferably have a height 48 that allows the guide ribs 40 and 42 to slide against the lateral guide surface 14 without contacting the bottom surface 190. As a result, the improved thumb referencing and guide system 11 provides lateral position control without interfering with the vertical position control provided by the first and second guide rails 116 and 118.

In one preferred embodiment, the guide member 12 has a width 50 between about 2.07 mm and 2.17 mm (2.12 mm preferred), a height 48 between about 5.2 mm and 5.4 mm (5.3 mm preferred), and a length 44 and 46 between about 6 mm and 12 mm (9 mm preferred). The first and second contact surfaces 60 and 62 have a height between about 5.2 mm and 5.5 mm (5.35 mm preferred) and are separated by a distance between about 2.35 mm and 2.45 mm (2.40 mm preferred).

The guide member 12 and the lateral guide surface 14 may be fabricated from any of a wide range of materials, such as polycarbonate plastic or metal. They may be formed as integral parts of the thumb assembly frame 82 and the picker frame 76, respectively, or may be fabricated as independent components. The guide member 12 and the lateral guide surface 14 are preferably fabricated of a material providing a low-friction surface. In one preferred embodiment, the guide member 12 is made of nylon having about 30% carbon fiber and about 15% Teflon® and the lateral guide surface 14 is made of polycarbonate having about 12% carbon fiber and about 12% Teflon®.

The improved thumb referencing and guide system 11 provides a reduced tolerance stack by referencing the lateral position of the thumb assembly 16 from only one side 78 of the picker frame 76, thereby substantially improving the lateral position control of the thumb assembly 16. The improved lateral position control also decreases the gap between the teeth 188 of the gear rack 134 and the pinion gear 136, thereby reducing gear backlash and improving accuracy of the longitudinal plunge motion of the thumb assembly 16 in the cartridge picker assembly 10.

The thumb assembly 16 may be moved between the retracted and extended positions 112 and 114 (FIGS. 9a and 9b), respectively, by any of a wide range of actuator systems. By way of example, in one preferred embodiment, the thumb assembly 16 may be moved between the retracted and extended positions 112 and 114, respectively, by a rack and pinion drive assembly of the type shown and described in U.S. Pat. application Ser. No. 09/045,558, filed Mar. 20, 1988, now U.S. Pat. No. 6,160,786, and entitled "Cartridge engaging assembly with Rack Drive Thumb Actuator System," which is incorporated herein by reference for all that it discloses. Alternatively, other types of thumb actuator systems may be used.

The rack and pinion drive system utilized in one preferred embodiment of the present invention is shown and described in U.S. Pat. No. 6,160,786, referred to above, is best seen in FIG. 6 and may comprise an elongate gear rack 134 that is affixed to the first side member 78 of the picker frame assembly 76. In one preferred embodiment, the gear rack 134 is attached to the first side member 78 to provide the second contact surface 62 described above as part of the improved thumb referencing and guide system 11. In this embodiment, the smooth rear side 62 of the gear rack 134 faces the first side member 78, while the toothed front side of the gear rack 134 faces the second side member 80 to engage with the rack and pinion drive system.

The gear rack 134 may be made from any of a wide range of materials, such as metals or plastics, suitable for the intended application, as will be described in more detail hereinafter.

The main body portion 82 of the thumb assembly 16 may be provided with a pinion gear 136 positioned so that it engages the gear rack 134. See FIGS. 2, 3 and 4. The pinion gear 136 is caused to rotate by a drive system 138 which, in one preferred embodiment, includes a motor 140 and a gear reduction system 142. The motor 140 may be mounted to the main body portion 82 of the thumb assembly 16 and is operatively associated with the gear reduction system 142 so that the motor 140 rotates the pinion gear 136 to extend and retract the thumb assembly 16.

The motor 140 may comprise any of a wide range of motors suitable for the intended application. In one preferred embodiment, the motor 140 comprises a permanent magnet D.C. motor, such as model no. RS-385PH, available from Mobuchi Co. of China, although other types may also be used.

The gear reduction system 142 may comprise a conventional gear reduction system utilizing a plurality of spur gears to provide a reduction ratio sufficient to allow the motor 140 to extend and retract the thumb assembly 16 at an appropriate speed and with sufficient force to withdraw and insert the data cartridge 22 into the selected cartridge receiving device. In one preferred embodiment, the gear reduction system 142 provides a reduction ratio of about 11.5:1, although other ratios may be used depending on, for example, the speed and torque characteristics of the particular motor 140 that is selected. The various spur gears comprising the gear reduction system 142 may be made from any convenient material, such as metal or plastic, suitable for the intended application. By way of example, in one preferred embodiment, the various spur gears comprising the gear reduction system 142 are made from brass and stainless steel. Alternatively, the gear reduction system could utilize other types of gears, such as worm gears, to provide the desired reduction.

Figure 3:
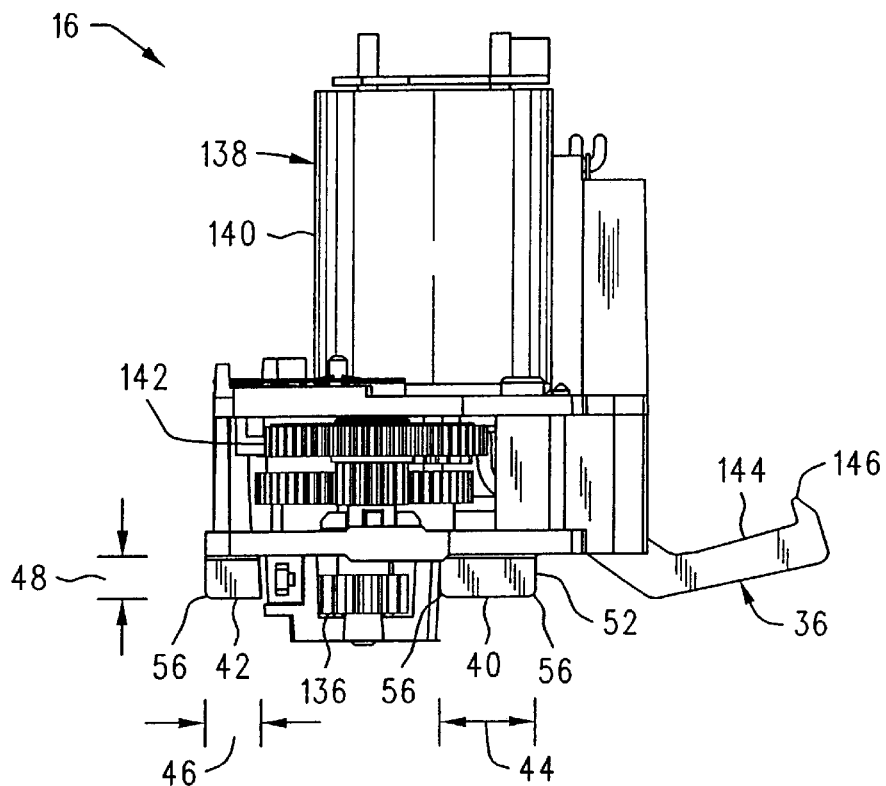
FIG. 3 is a side view of the thumb assembly of FIG. 2.
Figure 4:
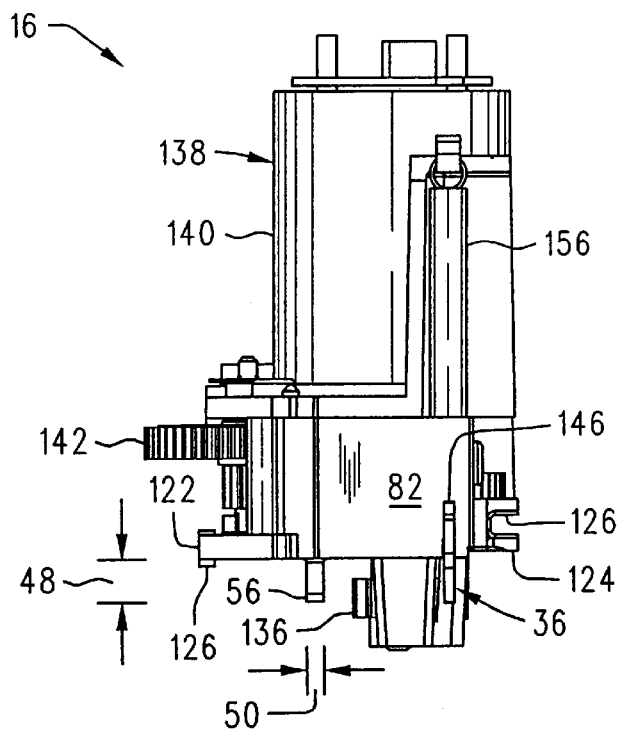
FIG. 4 is a front view of the thumb assembly of FIG. 2.

The thumb assembly 16 may also be provided with any of a wide variety of finger assemblies well-known in the art for engaging data cartridges, such as data cartridge 22. Accordingly, the present invention should not be regarded as limited to any particular type of finger assembly. By way of example, in one preferred embodiment, the finger assembly 36 may comprise an arm 144 having a hook portion 146, as best seen in FIG. 3. Hook portion 146 of arm 144 is configured to engage the notch 148 (FIGS. 9a and 9b) provided on the data cartridge 22. The arm 144 is pivotally mounted to the main body 82 of the thumb assembly 16 so that the arm 144 is free to pivot about pivot axis 150. See FIG. 6. A spring 156 may be used to bias the arm 144 toward the engaged position shown in FIG. 9a. The arm 144 may be provided with a pin 152 (FIG. 6) which engages a guide track 154 provided on the second side 80 of frame assembly 76 (FIG. 7). The guide track 154 actuates the arm 144 as the thumb assembly 16 moves back and forth between the retracted position 112 shown in FIG. 9a and the extended position 114 shown in FIG. 9b. However, since finger and track systems, such as finger assembly 36 and guide track 154, for engaging cartridges are well-known in the art and could be easily provided by persons having ordinary skill in the art after having become familiar with the teachings of the present invention, the particular finger assembly 36 and guide track 154 used in one preferred embodiment of the present invention will not be described in greater detail herein.

It is contemplated that the inventive concepts herein described may be variously otherwise embodied and it is intended that the appended claims be construed to include alternative embodiments of the invention except insofar as limited by the prior art.

What is claimed is:

1. A cartridge picker assembly, comprising:
   a frame having a first side wall and a second side wall positioned in spaced-apart relation, a portion of the first side wall of said frame forming a lateral guide surface, said lateral guide surface being substantially parallel to a lateral plane;
   a thumb assembly slidably mounted to the first and second side walls of said frame so that said thumb assembly is capable of moving toward and away from a cartridge access end of said frame; and
   a guide member mounted to said thumb assembly, said guide member engaging said lateral guide surface on the first side wall of said frame so that said thumb assembly may move toward and away from the cartridge access end of said frame.

2. The cartridge picker assembly of claim 1, wherein said lateral guide surface comprises:
   a first contact surface; and
   a second contact surface located in parallel spaced-apart relation to said first contact surface.

3. The cartridge picker assembly of claim 2, wherein said guide member has a width substantially equal to a distance between said first contact surface and said second contact surface.

4. The cartridge picker assembly of claim 2, wherein said guide member has a length along an X axis greater than a distance between said first contact surface and said second contact surface so that rotation of said thumb assembly around a Z axis is limited.

5. The cartridge picker assembly of claim 1, wherein said guide member comprises a plurality of guide ribs projecting from said thumb assembly.

6. The cartridge picker assembly of claim 1, further comprising a rack and pinion drive assembly operatively associated with said thumb assembly for moving said thumb assembly toward and away from the cartridge access end of said frame.

7. The cartridge picker assembly of claim 1, wherein said thumb assembly further comprises a finger assembly for selectively engaging and disengaging a cartridge.

* * * * *